(12) United States Patent
Malinowski et al.

(10) Patent No.: US 9,288,257 B2
(45) Date of Patent: Mar. 15, 2016

(54) MANAGING FILE TRANSFER COMMANDS

(71) Applicant: International Business Machines Corporation, Armonk, NY (US)

(72) Inventors: Joseph V. Malinowski, Bridgeview, IL (US); Miguel A. Perez, Tucson, AZ (US); David C. Reed, Tucson, AZ (US); Max D. Smith, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 13/874,802

(22) Filed: May 1, 2013

(65) Prior Publication Data

US 2014/0330935 A1    Nov. 6, 2014

(51) Int. Cl.
  *G06F 15/16* (2006.01)
  *H04L 29/08* (2006.01)
  *G06F 9/455* (2006.01)
  *G06F 9/50* (2006.01)
(52) U.S. Cl.
  CPC .............. *H04L 67/06* (2013.01); *G06F 9/455* (2013.01); *G06F 9/5061* (2013.01); *H04L 67/1097* (2013.01)
(58) Field of Classification Search
  USPC ......................................................... 709/219
  See application file for complete search history.

(56) References Cited

U.S. PATENT DOCUMENTS

| 2002/0129132 | A1* | 9/2002 | Sato ............................ 709/223 |
| 2005/0187979 | A1 | 8/2005 | Christensen et al. |
| 2006/0015652 | A1* | 1/2006 | Day et al. ........................ 710/5 |
| 2007/0043874 | A1* | 2/2007 | Nath et al. .................... 709/230 |
| 2008/0140703 | A1 | 6/2008 | Zondervan et al. |
| 2010/0138485 | A1 | 6/2010 | Chow et al. |

OTHER PUBLICATIONS

Yasinac, A, et al., "A Family of Protocols for Group Key Generation in Ad Hoc Networks," Computer Science Department, Florida State University. pp. 1-8. http://www.cs.fsu.edu/~yasinsac/Papers/YTCCO2.pdf.
Bhatti, N., et al., "Object Serialization and Deserialization Using XML," Advances in Data Management 2000, Tata McGraw-Hill Publishing Company Ltd., 10 pages. © CSI 2000. ftp://ftp.cse.buffalo.edu/users/azhang/disc/disc01/cd1/out/papers/comad/objectserialisanwr.pdf.

* cited by examiner

*Primary Examiner* — Michael Y Won
*Assistant Examiner* — Karina J Garcia-Ching
(74) *Attorney, Agent, or Firm* — Nicholas D. Bowman; Robert Sullivan

(57) ABSTRACT

A method of and system for managing file transfer commands to a remote system is disclosed. The method and system may include establishing a first defined file transfer command having a first group identifier. The first defined file transfer command may be configured to pull data from the remote system. The method and system may include establishing a second defined file transfer command having a second group identifier. The second defined file transfer command may be configured to at least one of delete data of the remote system and push data to the remote system. The method and system may include performing the first defined file transfer command after performing the second defined file transfer command when the first group identifier and the second group identifier match.

9 Claims, 4 Drawing Sheets

300

Begin
301

↓

Establishing a first defined file transfer command having a first group identifier, the first defined file transfer command configured to pull data from the remote system

310

↓

Establishing a second defined file transfer command having a second group identifier, the second defined file transfer command configured to at least one of delete data of the remote system and push data to the remote system

320

↓

Performing the first defined file transfer command after performing the second defined file transfer command when the first group identifier and the second group identifier match

330

↓

Done
399

FIG. 3

MANAGING FILE TRANSFER COMMANDS

TECHNICAL FIELD

This disclosure relates generally to computer-implemented data storage and, more particularly, relates to file transfer.

BACKGROUND

A communications protocol may be a system of digital message formats and rules for exchanging those messages in or between computing systems and in telecommunications. File transfer protocol (FTP) is a communications protocol used to transfer files from one host to another host. The hosts may be at the same location or at different locations a great distance apart. Unique FTP clients may present their own unique set of FTP commands to users.

SUMMARY

Aspects of the disclosure may include method of and system for managing file transfer commands to a remote system. The method and system may include establishing a first defined file transfer command having a first group identifier. The first defined file transfer command may be configured to pull data from the remote system. The method and system may include establishing a second defined file transfer command having a second group identifier. The second defined file transfer command may be configured to at least one of delete data of the remote system and push data to the remote system. The method and system may include performing the first defined file transfer command after performing the second defined file transfer command when the first group identifier and the second group identifier match.

Aspects of the disclosure may include the file transfer commands to be file transfer protocol (FTP) commands. In embodiments, the first defined FTP command may be a GET command. In embodiments, the second defined FTP command may include at least one of a DELETE command and a PUT command. In embodiments, the first and second defined FTP commands may be user-defined. In embodiments, other considerations may include if the first defined FTP command is being carried out or if the first defined FTP command is queued to be carried out. In embodiments, the first and second defined FTP commands may be performed in an order based on a temporal element. Aspects of the disclosure may enable multiple systems to update or read from a single storage appropriately.

BRIEF DESCRIPTION OF THE DRAWINGS

FIG. 3 is a flowchart illustrating an operation managing file transfer commands to a remote system according to an embodiment.

DETAILED DESCRIPTION

Figure 1:
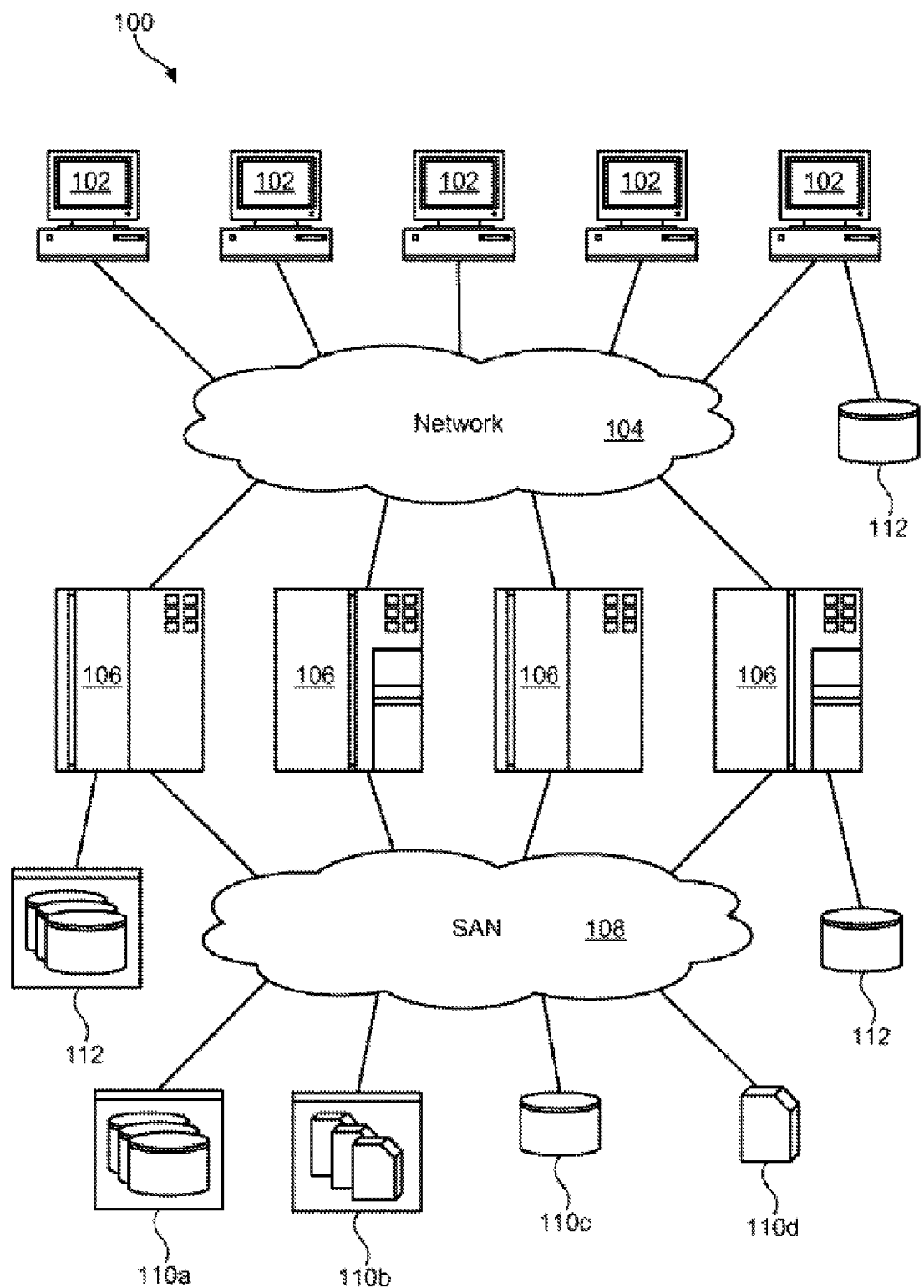
FIG. 1 illustrates an example network architecture according to an embodiment.

File transfer programs may have a variety of file transfer commands associated with transferring files between a local host (i.e. host system) and a remote host (i.e. remote system) or between two remote hosts (e.g., the host system may be a second remote system). The file transfer commands may be file transfer protocol (FTP) commands. The FTP commands may include a GET command, a DELETE command, and a PUT command or similar commands adapted to perform a substantially equivalent action.

The GET command may copy a file from the remote host to the local host. Put differently, the GET command may be configured to pull data from the remote system. The DELETE command may delete a file in the current remote directory. The DELETE command may be configured to delete data of the remote system. The PUT command may copy a file from the local host to the remote host. Put differently, the PUT command may be configured to push data to the remote system.

Updating or reading storage on a server that may be centralized may be done utilizing FTP. To update a storage two commands may be included, the two commands being a DELETE command and a PUT command. A DELETE may or may not be necessary. For example, when a file name fails to exist on the remote system a DELETE may or may not be necessary and the DELETE itself may fail. A DELETE may occur if data already exists on the remote system under the file name. To read the storage, the GET command may be utilized. In the case when multiple systems update or read from a single storage at a substantially equivalent time, an error or an incomplete copy of the storage may be experienced.

Aspects of the disclosure may manage file transfer commands to a remote system. The file transfer commands may be FTP commands. The FTP commands may include a first defined FTP command having a first group identifier. The first defined FTP command may be configured to pull data from the remote system. In embodiments, the first defined FTP command may be a GET command. The FTP commands may include a second defined FTP command having a second group identifier. The second defined FTP command may be configured to at least one of delete data of the remote system and push data to the remote system. In embodiments, the second defined FTP command may include at least one of a DELETE command and a PUT command. In embodiments, the first and second defined FTP commands may be user-defined.

Managing the FTP commands may include performing the first defined FTP command after performing the second defined FTP command when the first group identifier and the second group identifier match. In embodiments, other considerations may include if the first defined FTP command is being carried out or if the first defined FTP command is queued to be carried out. In embodiments, the first and second defined FTP commands may be performed in an order based on a temporal element. Aspects of the disclosure may enable multiple systems to update or read from a single storage appropriately.

FIG. 1 illustrates an example network architecture 100 according to an embodiment. The network architecture 100 is presented to show one example of an environment where a system and method in accordance with the disclosure may be implemented. The network architecture 100 is presented only by way of example and is not intended to be limiting. The system and methods disclosed herein may be applicable to a wide variety of different computers, servers, storage devices, and network architectures, in addition to the network architecture 100 shown.

As shown, the network architecture 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "host systems" 106). In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like. One or more of the storage systems 112 may contain storage pools that may benefit from management techniques of the disclosure.

The network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC). One or more of the storage systems 110 may contain storage pools that may benefit from management techniques according to the disclosure.

Figure 2:
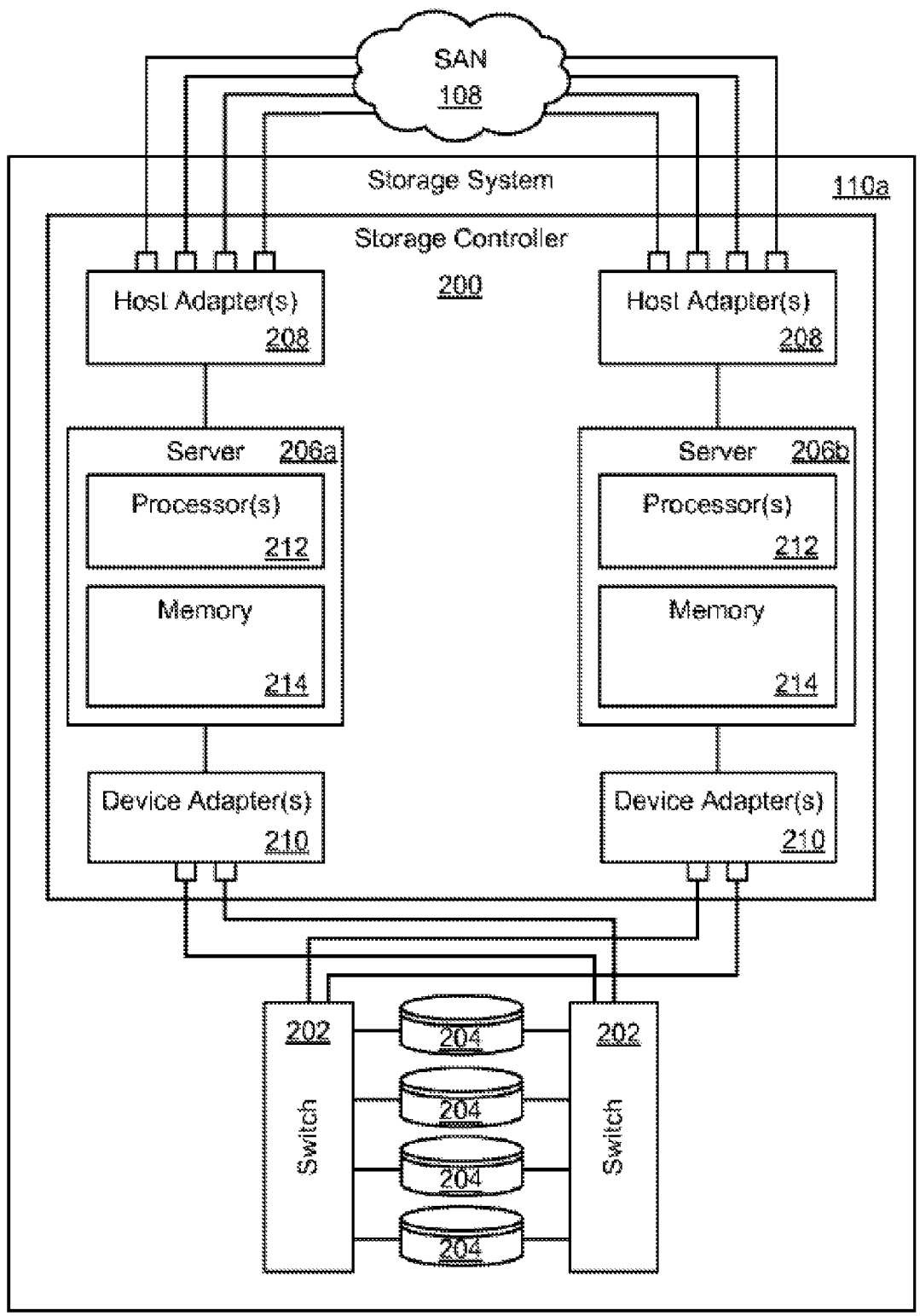
FIG. 2 illustrates an example storage system containing an array of storage devices according to an embodiment.

FIG. 2 illustrates an example storage system 110a containing an array of storage devices 204 (e.g., hard-disk drives 204 and/or solid-state drives 204) according to an embodiment. The internal components of the storage system 110a are shown in accordance with the disclosure and may be used to manage file transfer commands associated with such a storage system 110a. Nevertheless, management techniques according to the disclosure may also be implemented within other storage systems 110, 112. As shown, the storage system 110a includes a storage controller 200, one or more switches 202, and one or more storage devices 204, such as hard-disk drives 204 or solid-state drives 204 (e.g., flash-memory-based drives 204). The storage controller 200 may enable one or more hosts 106 (e.g., open system and/or mainframe servers 106) to access data stored in the one or more storage devices 204.

As shown in FIG. 2, the storage controller 200 includes one or more servers 206. The storage controller 200 may also include host adapters 208 and device adapters 210 to connect the storage controller 200 to host devices 106 and storage devices 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 204. This process may be referred to as a "failover."

Particular enterprise storage systems may have a storage system 110a having an architecture similar to that illustrated in FIG. 2. Particular enterprise storage systems may include a high-performance, high-capacity storage controller providing disk storage that is designed to support continuous operations. Particular enterprise storage systems may use servers 206a, 206b, which may be integrated with a virtualization engine technology. Nevertheless, management techniques according to the disclosure are not limited to any specific enterprise storage system 110a, but may be implemented in any comparable or analogous storage system 110 regardless of the manufacturer, product name, or components or component names associated with the storage system 110. Any storage system 110 that could benefit from management techniques according to the disclosure is deemed to fall within the scope of the disclosure. Thus, the enterprise storage system shown is presented only by way of example and is not intended to be limiting.

In selected embodiments, each server 206 includes one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 212 and are used to access data in the storage devices 204. The servers 206 may host at least one instance of these software modules. These software modules may manage all read and write requests to logical volumes in the storage devices 204.

FIG. 3 is a flowchart illustrating an operation 300 managing file transfer commands to a remote system according to an embodiment. The file transfer commands may be file transfer protocol (FTP) commands. Operation 300 may manage file transfer commands to the remote system enabling multiple systems to update or read from a single storage appropriately. Operation 300 may begin at block 301. A first defined file transfer command having a first group identifier may be established at block 310. The first group identifier may be in a parameter of a command definition. The first defined file transfer command may be configured to pull data from the remote system. The first defined file transfer command may serve to read storage on a server. In embodiments, the first defined file transfer command may be a GET command.

A second defined file transfer command having a second group identifier may be established at block 320. The second group identifier may be in the parameter of the command definition. The second defined file transfer command may be configured to at least one of delete data of the remote system and push data to the remote system. The second defined file transfer command may serve to update storage on a server. In embodiments, the second defined file transfer command may include at least one of a DELETE command and a PUT command. In embodiments, deleting data of the remote system may occur before pushing data to the remote system. Deleting data of the remote system may occur when a same file name exists on the remote system. Attempting to delete data when the same file name fails to exist may result in an error. As such, attempting to delete data may or may not occur when the same file name fails to exist.

In embodiments, the first and second defined file transfer commands may be user-defined. In embodiments, the first group identifier may represent a first system group. Similarly, the second group identifier may represent a second system group. The first system group may include a first system. The second system group may include a second system. In embodiments, the first system group and the second system group may be a same system group. The first and second systems of the same system group may be associated with one remote system storage. As such, multiple systems may be associated with (e.g., update, read from) a single storage.

The first defined file transfer command may be performed after performing the second defined file transfer command when the first group identifier and the second group identifier match at block 330. Thus, in embodiments, a read of data from a storage may be performed after an update of data to the storage. Thus, in embodiments, a GET command may be performed after other commands such as a PUT command. In embodiments, performing the first and second defined file transfer commands may include the first and second defined file transfer commands being prioritized in a command queue. In embodiments, performing the first and second defined file transfer commands may include ordering performance of the first and second defined file transfer commands.

In embodiments, the first defined file transfer command may be performed after performing the second defined file transfer command when the first defined file transfer command is not being carried out. Thus, operation 300 may or may not have impact when a defined file transfer command is already processing. In embodiments, the first defined file transfer command may be performed after performing the second defined file transfer command when the first defined file transfer command is queued to be carried out. Thus, operation 300 may impact the command queue associated with the defined file transfer command.

In embodiments, the first and second defined file transfer commands may be performed in an order based on a temporal element. The temporal element may include a requesting server time. In effect, operation 300 may process a primary priority tier before a secondary priority tier. The primary priority tier may perform the read of data from the storage after an update of data to the storage. Multiple updates or multiple reads may be included. The secondary priority tier may order the multiple updates or multiple reads by the requesting server time which may be a timestamp.

In embodiments, operation 300 may include receiving on the remote system the first and second file transfer commands. The receiving may occur after establishing the first and second file transfer commands. The receiving may occur before performing the first and second file transfer commands. Operation 300 may conclude at block 399. Operation 300 may enable multiple systems to update or read from a single storage appropriately.

Figure 4:
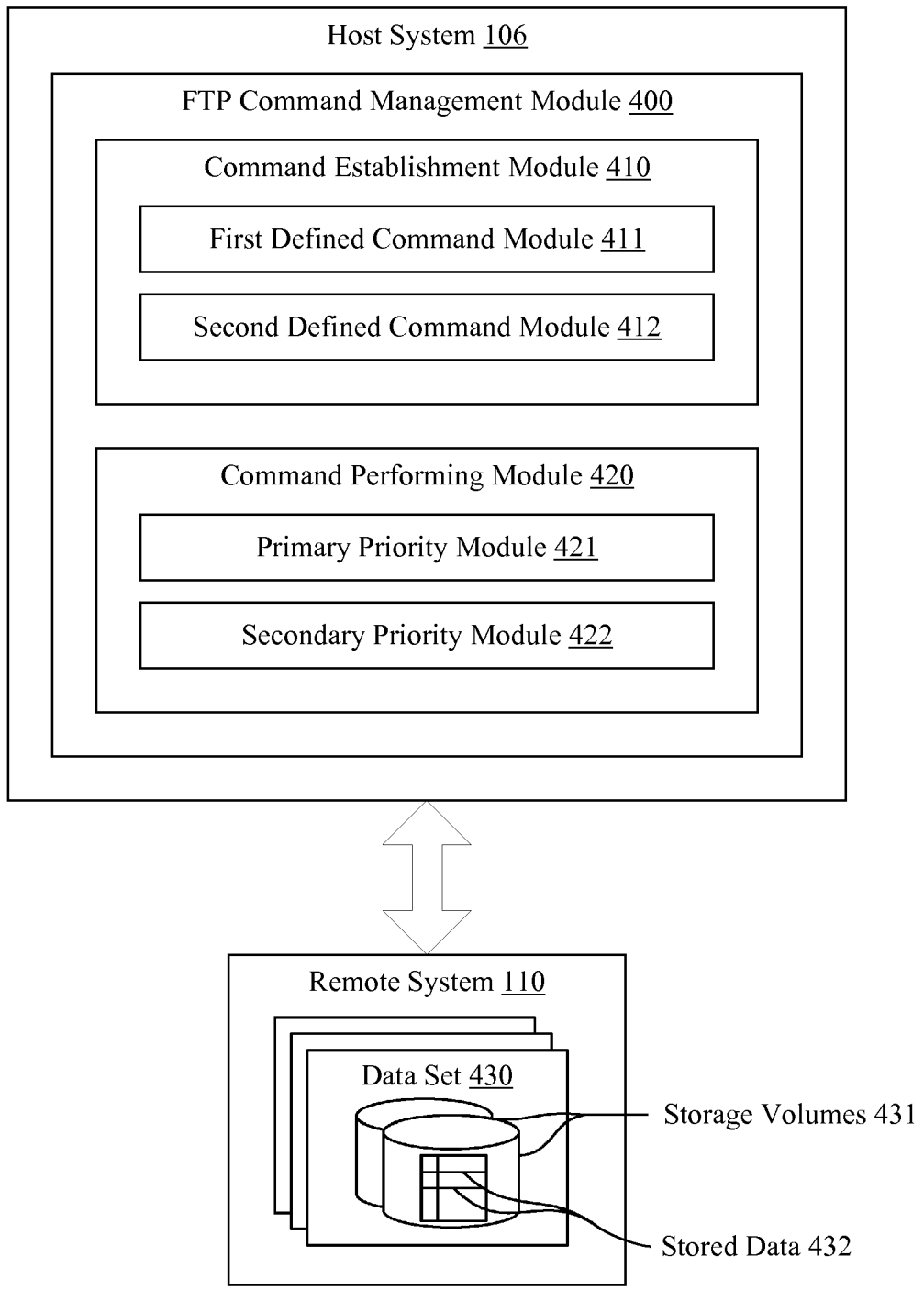
FIG. 4 shows modules of a system implementing an operation according to an embodiment.

FIG. 4 shows modules of a system implementing operation 300 according to an embodiment. In embodiments, operation 300 may be implemented in the form of one or more modules. These modules may be implemented in hardware, software or firmware executable on hardware, or a combination thereof. For example, module functionality may occur in a host system 106 may actually be implemented in a remote system 110 and vice versa. Other functionality may be distributed across the host system 106 and the remote system 110.

A host system 106 may include an FTP command management module 400. The FTP command management module 400 may manage FTP commands to the remote system 110. The remote system 110 may host a data set 430 comprising storage volumes 431 adapted to have storage data 432. The FTP command management module may manage FTP commands to the remote system 110 enabling multiple systems to update or read from a single storage appropriately. The FTP command management module 400 may include a command establishment module 410 and a command performing module 420.

The command establishment module 410 may include a first defined command module 411 and a second defined command module 412. The first defined command module 411 may establish a first defined FTP command having a first group identifier. The first defined FTP command may be configured to pull data from the remote system 110. The first defined FTP command may serve to read storage on a server. In embodiments, the first defined FTP command may be a GET command.

The second defined command module 412 may establish a second defined FTP command having a second group identifier. The second defined FTP command may be configured to at least one of delete data of the remote system 110 and push data to the remote system 110. The second defined FTP command may serve to update storage on a server. In embodiments, the second defined FTP command may include at least one of a DELETE command and a PUT command. In embodiments, deleting data which may be stored data 432 of the remote system 110 may occur before pushing data to the remote system 110. Deleting data of the remote system 110 may occur when a same file name exists on the remote system 110. Attempting to delete data when the same file name fails to exist may result in an error. As such, attempting to delete data may or may not occur when the same file name fails to exist.

In embodiments, the first and second defined FTP commands may be user-defined. In embodiments, the first group identifier may represent a first system group. Similarly, the second group identifier may represent a second system group. The first system group may include a first system. The second system group may include a second system. In embodiments, the first system group and the second system group may be a same system group. The first and second systems of the same system group may be associated with one remote system storage which may be one of the storage volumes 431 of the remote system 110. As such, multiple systems may be associated with (e.g., update, read from) a single storage.

The command performing module 420 may include a primary priority module 421 and a secondary priority module 422. The primary priority module 421 may perform the read of data from the storage after an update of data to the storage. Multiple updates or multiple reads may be included. As part of the primary priority module 421, the first defined FTP command may be performed after performing the second defined FTP command when the first group identifier and the second group identifier match. Thus, in embodiments, a GET command may be performed after other commands such as a PUT command. In embodiments, performing the first and second defined FTP commands may include the first and second defined FTP commands being prioritized in a command queue. In embodiments, performing the first and second defined FTP commands may include ordering performance of the first and second defined FTP commands.

In embodiments, the first and second defined FTP commands may be performed in an order based on a temporal element. The temporal element may include a requesting server time. The requesting server time may be a timestamp. The secondary priority module 422 may order the multiple updates or multiple reads by the requesting server time. In embodiments, the command performing module 420 may process the primary priority module 421 before the secondary priority module.

In embodiments, the first defined FTP command may be performed after performing the second defined FTP command when the first defined FTP command is not being carried out. Thus, the command performing module 420 and therefore the FTP command management module 400 may or may not have impact when a defined FTP command is already processing. In embodiments, the first defined FTP command may be performed after performing the second defined FTP command when the first defined FTP command is queued to be carried out. Thus, the command performing module 420 and therefore the FTP command management module 400 may impact the command queue associated with the defined FTP command.

In embodiments, the FTP command management module 400 may include receiving on the remote system the first and second FTP commands. The receiving may occur after establishing the first and second FTP commands. The receiving may occur before performing the first and second FTP commands. FTP command management module 400 may enable multiple systems to update or read from a single storage appropriately.

Aspects of the disclosure may apply to a variety of file transfer methodologies or systems. FTP is used throughout the disclosure to illustrate aspects of the disclosure. In addition to embodiments described above, other embodiments having fewer operational steps, more operational steps, or different operational steps are contemplated. Also, some embodiments may perform some or all of the above operational steps in a different order. The modules are listed illustratively according to an embodiment and are not meant to indicate necessity of a particular module or exclusivity of other potential modules.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the disclosure may be devised without departing from the basic scope thereof, and the scope thereof is determined by the claims that follow.

What is claimed is:

1. A computer implemented method for managing file transfer protocol (FTP) commands to a remote system, the method comprising:
    receiving a first defined FTP command having a first group identifier;
    queuing the received first defined FTP command in a command queue;
    receiving, while the first defined FTP command is queued in the command queue, a second defined FTP command having a second group identifier;
    comparing the first group identifier from the queued first defined FTP command and the second group identifier from the received second defined FTP command;
    determining, based on the comparing, that the first group identifier and the second group identifier match;
    identifying the first defined FTP command as being configured to cause data to be pulled from the remote system;
    identifying the second defined FTP command as being configured to cause the performance of at least one of a group of actions consisting of: pushing data to the remote system and deleting data of the remote system;
    prioritizing, in response to the determining that the group identifiers match, in further response to the identifying the first defined FTP command as being configured to cause data to be pulled from the remote system, and in further response to the identifying the second defined FTP command as being configured to cause the performance of at least one of the group of actions consisting of: pushing data to the remote system and deleting data of the remote system, the second defined FTP command ahead of the first defined FTP command in the command queue;
    executing, in response to the prioritizing, the second defined FTP command; and
    executing, after the executing the second defined FTP command, the first defined FTP command.

2. The method of claim 1, wherein the first defined FTP command is a GET command and the second defined FTP command includes at least one of a DELETE command and a PUT command.

3. A computer implemented method for managing file transfer protocol (FTP) commands to a remote system, the method comprising:
    establishing a first defined FTP command having a first group identifier;
    determining that the first defined FTP command is configured to pull data from the remote system;
    establishing a second defined FTP command having a second group identifier;
    determining that the second defined FTP command is configured to at least one of delete data of the remote system and push data to the remote system;
    determining that the first group identifier and the second group identifier match;
    prioritizing, in response to the determining that the first group identifier and the group identifier match, in further response to the determining that the first defined FTP command is configured to pull data from the remote system, and in further response to determining that the second defined FTP command is configured to at least one of delete data of the remote system and push data to the remote system, the second defined FTP command ahead of the first defined FTP command in a command queue;
    executing, in response to the prioritizing, the second defined FTP command;
    executing, after the executing the second defined FTP command, the first defined FTP command; and
    wherein matching group identifiers correspond to groups of client devices that share storage devices on the remote system such that the first group identifier and the second group identifier matching indicates that the first defined FTP command and the second defined FTP command came from client devices that share a storage device on the remote system with each other.

4. A system for managing file transfer protocol (FTP) commands, comprising:
    a remote system; and
    a host system, at least one of the remote system and the host system including a processor in communication with a memory, wherein loading instructions from the memory into the processor causes the processor to perform steps of:

receiving a first defined FTP command having a first group identifier;

queuing the received first defined FTP command in a command queue;

receiving, while the first defined FTP command is queued in the command queue, a second defined FTP command having a second group identifier;

comparing the first group identifier from the queued first defined FTP command and the second group identifier from the received second defined FTP command;

determining, based on the comparing, that the first group identifier and the second group identifier match;

identifying the first defined FTP command as being configured to cause data to be pulled from the remote system;

identifying the second defined FTP command as being configured to cause the performance of at least one of a group of actions consisting of: pushing data to the remote system and deleting data of the remote system;

prioritizing, in response to the determining that the group identifiers match, in further response to the identifying the first defined FTP command as being configured to cause data to be pulled from the remote system, and in further response to the identifying the second defined FTP command as being configured to cause the performance of at least one of the group of actions consisting of: pushing data to the remote system and deleting data of the remote system, the second defined FTP command ahead of the first defined FTP command in the command queue;

executing, in response to the prioritizing, the second defined FTP command; and executing, after the executing the second defined FTP command, the first defined FTP command.

5. The method of claim 1, further comprising:

receiving, while the first defined FTP command is queued in the command queue, a third defined FTP command having a third group identifier;

comparing the first group identifier from the queued first defined FTP command and the third group identifier from the received third defined FTP command;

determining, based on the comparing, that the first group identifier and the third group identifier do not match;

identifying the third defined FTP command as being configured to cause the performance of at least one of a group of actions consisting of: pushing data to the remote system and deleting data of the remote system;

prioritizing, in response to the determining that the first group identifier and third group identifier do not match and in further response to the receiving the third defined FTP command while the first defined FTP command is queued in the command queue, the third defined FTP command behind the first defined FTP command in the command queue; and executing, after the executing the first defined FTP command, the third defined FTP command.

6. The method of claim 1, further comprising:

receiving, while the first defined FTP command and the second defined FTP command are queued in the command queue, a third defined FTP command having a third group identifier;

determining that the third group identifier matches the first and the second group identifiers;

identifying the third defined FTP command as being configured to cause the performance of at least one of a group of actions consisting of: pushing data to the remote system and deleting data of the remote system;

prioritizing, in response to the determining that the third group identifier matches the first and the second group identifiers, in further response to the receiving the third defined FTP command while the first defined FTP command and the second defined FTP command are queued in the command queue, in further response to the identifying the first defined FTP command as a pull command, in further response to the identifying the second defined FTP command as at least one of a group of command types consisting of: a push command and a delete command, and in further response to the identifying the third defined FTP command as at least one of a group of command types consisting of: a push command and a delete command, the third defined FTP command behind the second defined FTP command and ahead of the first defined FTP command in the command queue; and executing, after the executing the second defined FTP command and before the executing the first defined FTP command, the third defined FTP command.

7. The method of claim 1, wherein the receiving the first defined FTP command is at a host device and from a first client device, and wherein the receiving the second defined FTP command is at the host device and from a second client device.

8. The method of claim 7, wherein group identifiers correspond to groups of client devices that share storage on the remote system such that the matching of the first group identifier and the second group identifier serves to indicate that the first client device and the second client device share storage with each other on the remote system.

9. The method of claim 5, wherein the receiving the first defined FTP command is at a host device and from a first client device, wherein the receiving the second defined FTP command is at the host device and from a second client device, wherein the receiving the third defined FTP command is at the host device and from a third client device, and wherein group identifiers correspond to groups of client devices that share storage on the remote system such that the matching of the first group identifier and the second group identifier serves to indicate that the first client device and the second client device are part of a same group and share storage with each other on the remote system and further such that the non-matching of the first group identifier and the third group identifier serves to indicate that the third client device is not part of the same group and does not share storage with the first client device on the remote system.

* * * * *